United States Patent Office 3,318,937
Patented May 9, 1967

3,318,937
CARBAMYL AND THIOCARBAMYL PHOSPHATES
Otto Rohr, Neu-Allschwil, Basel-Stadt, Switzerland, assignor to Ciba Limited, Basel, Switzerland, a Swiss company
No Drawing. Filed Nov. 18, 1963, Ser. No. 324,210
Claims priority, application Switzerland, Nov. 22, 1962, 13,768/62
3 Claims. (Cl. 260—455)

The present invention provides pesticidal compositions that contain as active principle a compound of the general formula

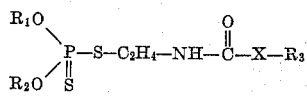

in which $R_1$ and $R_2$ each represents an alkyl radical containing 1 to 4 carbon atoms, advantageously a methyl or ethyl radical, X represents an oxygen atom or a sulfur atom, and $R_3$ represents an alkyl radical containing up to 5 carbon atoms that can be interrupted by 1 or 2 oxygen atoms or 1 sulfur atom or by an $SO_2$ group, or a halogen-alkyl radical, advantageously a chloro-alkyl radical or a bromo-alkyl radical, containing up to 4 carbon atoms, or an alkenyl radical containing up to 4 carbon atoms or a cyano-ethyl radical, or a benzyl radical, or a phenyl radical substituted by a chlorine atom or an alkyl radical containing up to 4 carbon atoms, or the radical

—$CH_2$—$COOR_4$ in which $R_4$ represents an alkyl radical having 1 to 4 carbon atoms, and, if desired or required, at least one of the following additives: a solvent, a diluent, a dispersing agent, a wetting agent, an adhesive and also another pesticide.

The new preparations are suitable, for example, for combating harmful insects, acarids, nematodes and gastropods. The effect of the new compounds on harmful aphids and acarids deserves special mention—they act on the pests at different stages in their development, for example, on the eggs, larvae and imagines. The new compounds act both as stomach poisons and contact poisons.

The new compounds of the general Formula I can be prepared, for example, by reacting a compound of the general formula

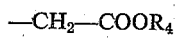

in which $R_1$ and $R_2$ have the meanings ascribed to them in the general Formula I above and Me represents an alkali metal ion, especially $Na^+$, with an N-chloroethyl-carbamate or thiocarbamate of the general formula

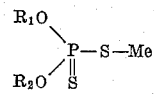

in which X and $R_3$ have the meanings ascribed to them in the general Formula I above, in the presence of an inert organic solvent, for example, methylisobutylketone and at a raised temperature, preferably within the range from 20 to 100° C. with elimination of the compound MeCl. Compounds that are specially effective against the aforementioned pests are those of the general formula

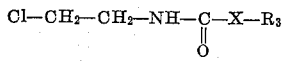

in which $R_1$ and $R_2$ each represents a methyl or ethyl radical, X represents an oxygen atom or a sulfur atom and $R_3$ represents an alkyl or alkenyl radical containing up to 4 carbon atoms.

As has already been mentioned above, the new preparations can contain various additives in addition to the new active principles of the general Formula I. Hence, the new active principles can be made up in a very wide variety of forms, which forms will be discussed in greater detail below.

Spray solutions for direct application contain, for example, mineral oil fractions having a high to medium boiling range, especially above 100° C., for example, diesel oil and kerosene, coal tar oil and oils of vegetable or animal origin, hydrocarbons, for example, alkylated naphthalene, tetrahydronaphthalene, xylene mixtures and cyclohexanols and, if desired or required, ketones and chlorinated hydrocarbons, for example, tetrachloroethane, trichloroethylene, trichlorobenzene and tetrachlorobenzene.

When they are to be applied in an aqueous form, use is made of emulsion concentrates, pastes or wettable powders that can be diluted with water to give aqueous spraying liquors. As emulsifying or dispersing agents there are used nonionic products, for example, condensation products of aliphatic alcohols, amines or carboxylic acids with a long-chain hydrocarbon radical having 10 to 30 carbon atoms and ethylene oxide, for example, the condensation product of octadecylalcohol and 25 to 30 mols of ethylene oxide, or that of soya bean oil fatty acid and 30 mols of ethylene oxide, or that of commercial oleylamine and 15 mols of ethylene oxide, or that of dodecylmercaptan and 12 mols of ethylene oxide. However, other condensation products of ethylene oxide and hydroaromatic polycyclic carboxylic acids or amines can also be used. As anionic emulsifying agents that can be used, there may be mentioned the sodium salt of dodecylalcohol sulfuric acid ester, the sodium salt of dodecylbenzene sulfonic acid, the potassium or triethanolamine salt of oleic acid or abietic acid or mixtures of these acids, or the sodium salt of a petroleum sulfonic acid. As cationic dispersing agents there may be used quaternary ammonium or phosphonium compounds, for example, cetylpyridinium chloride or dihydroxyethylbenzyldodecylammonium chloride.

Dusting or strewing agents contain talcum, kaolin, bentonite, sand, calcium phosphate or charcoal, cork meal and wood meal and other materials of vegetable origin as solid carrier substances. The various preparations may contain the usual additives that improve dispersion, adhesion and penetration; as such additives there may be mentioned fatty acids, resins, glue, casein or, for example, alginates. It is also highly advantageous to use the preparations in granulated form. The new compounds may be present in pesticides as the only active principles or they may be present in admixture with other insecticides, acaricides, nematocides and molluscacides. For use in plant protection, such preparations are applied by the conventional spraying, sprinkling, dusting and fumigating methods.

The present invention also includes the compounds of the above general Formula I as such.

The following examples illustrate the invention. Unless otherwise stated, the parts and percentages are by weight.

*Example 1*

(1) 20.8 parts of the sodium salt of diethyldithiophosphoric acid were dissolved in 50 parts by volume of methylisobutylketone. A solution of 16.6 parts of N-chlorethylisopropylcarbamate (B.P. 46 to 49° C. at 0.01 mm. of Hg) in 25 parts by volume of methylisobutylketone was added dropwise at 65 70° C. The whole was stirred for 5 hours at 75 to 80° C., filtered off from the precipitated sodium chloride, and the filtrate was concentrated by evaporation in vacuo. The residue was taken up in 250 parts by volume of benzene and washed twice with 50 parts by volume of water. The solution was dried over sodium sulphate and the solvent was evaporated off in vacuo. The residue was distilled in high vacuum. The compound of the formula $$(C_2H_5O)_2\overset{S}{\underset{\parallel}{P}}-S-CH_2CH_2NH-\overset{O}{\underset{\parallel}{C}}-O-CH\overset{CH_3}{\underset{CH_3}{\diagdown}}$$

was obtained. B.P. 150 to 153° C. at 0.08 mm. of Hg; $n_D^{25}$: 1.5030; 14.4 parts (45.7%).

Analysis.—Calculated: S 20.33%. Found: S 20.25%.

(2) 20.8 parts of the sodium salt of diethyldithiophosphoric acid were reacted with 18.2 parts of N-chlorethyl-2-methoxyethylcarbamate in a manner analogous to that described under 1. After distillation in a high vacuum, there were obtained 11.2 parts of a compound of the formula $$(C_2H_5O)_2\overset{S}{\underset{\parallel}{P}}-SCH_2CH_2NHCOOCH_2CH_2OCH_3$$

B.P. 161 to 164° C. at 0.07 mm. of Hg; $n_D^{25}$: 1.5080.

Analysis.—Calculated: S 19.35%. Found: S 18.81%.

(3) 20.8 parts of the sodium salt of diethyldithiophosphoric acid were reacted with 20 parts of N-chlorethyl-1-chloro-2-propylcarbamate (B.P. 83 to 84° C. at 0.01 mm. of Hg) in a manner analogous to that described under 1. After distillation in a high vacuum, there were obtained 16 parts of a compound of the formula $$(C_2H_5O)_2\overset{S}{\underset{\parallel}{P}}-SCH_2CH_2NHCOOCH\overset{CH_2Cl}{\underset{CH_3}{\diagdown}}$$

B.P. 175° C. at 0.01 mm. of Hg; $n_D^{26}$: 1.5095.

Analysis.—Calculated: S 10.09%. Found: S 9.93%.

(4) 20.8 parts of the sodium salt of diethyldithiophosphoric acid were reacted with 13.8 parts of N-chlorethylmethylcarbamate (B.P. 38 to 40° C. at 0.01 mm. of Hg; $n_D^{24}$: 1.4573) in a manner analogous to that described under 1. After distillation in a high vacuum (molecular distillation column), there were obtained 10.9 parts of a compound of the formula $$(C_2H_5O)_2\overset{S}{\underset{\parallel}{P}}-SCH_2CH_2NHCOOCH_3$$

B.P. 150° C. at 0.01 mm. of Hg; $n_D^{25}$: 1.5160.

Analysis.—Calculated: S 22.32%. Found: S 22.0%.

(5) 20.8 parts of the sodium salt of diethyldithiophosphoric acid were reacted with 15.2 parts of N-chlorethylethylcarbamate (B.P. 43 to 45° C. at 0.015 mm. of Hg); in a manner analogous to that described under 1. After distillation in a high vacuum (molecular distillation column), there were obtained 11 parts of a compound of the formula $$(C_2H_5O)_2\overset{S}{\underset{\parallel}{P}}-SCH_2CH_2NHCOOC_2H_5$$

B.P. 150° C. at 0.04 mm. of Hg; $n_D^{26}$: 1.5092.

Analysis.—Calculated: S 21.28%. Found: S 21.0%.

(6) 20.8 parts of the sodium salt of diethyldithiophosphoric acid were reacted with 18.2 parts of N-chlorethyl-S-isopropyl-thiocarbamate (B.P. 76° C. at 0.015 mm. of Hg) in a manner analogous to that described under 1. After distillation in a high vacuum (molecular distillation column), there were obtained 14.2 parts of a compound of the formula $$(C_2H_5O)_2\overset{S}{\underset{\parallel}{P}}-SCH_2CH_2NHCOSCH\overset{CH_3}{\underset{CH_3}{\diagdown}}$$

B.P. 150° C. at 0.01 mm. of Hg; $n_D^{27}$: 1.5352.

Analysis.—Calculated: S 29.02%. Found: S 28.4%.

(7) 20.8 parts of the sodium salt of diethyldithiophosphoric acid were reacted with 21.2 parts of N-chlorethylethylmercaptoethylcarbamate ($n_D^{24}$: 1.5006) in a manner analogous to that described under 1. 15 parts of a compound of the formula $$(C_2H_5O)_2\overset{S}{\underset{\parallel}{P}}-SCH_2CH_2NHCOOCH_2CH_2SC_2H_5$$

were obtained in the form of an oil that cannot be further distilled. $n_D^{25}$: 1.5262.

(8) 20.8 parts of the sodium salt of diethyldithiophosphoric acid were reacted with 16.8 parts of N-chlorethyl-S-ethyl-thiocarbamate (B.P. 84 to 88° C. at 0.15 mm. of Hg) in a manner analogous to that described under 1. After distillation in a high vacuum (molecular distillation column), there were obtained 14 parts of a compound of the formula $$(C_2H_5O)_2\overset{S}{\underset{\parallel}{P}}-SCH_2CH_2NHCOSC_2H_5$$

B.P. 175° C. at 0.02 mm. of Hg; $n_D^{25}$: 1.5422.

Analysis.—Calculated: S 30.3%. Found: S 28.6%.

(9) 20.8 parts of the sodium salt of diethyldithiophosphoric acid were reacted with 20 parts of the carbamate of the formula $ClCH_2CH_2NHCOOCH_2CH_2SO_2C_2H_5$ in a manner analogous to that described under 1. 17 parts of a compound of the formula $$(C_2H_5O)_2P-SCH_2CH_2NHCOOCH_2CH_2SO_2C_2H_5$$
$$\underset{\parallel}{S}$$

were obtained in the form of an oil that cannot be distilled. $n_D^{26}$: 1.5214.

(10) 20.8 parts of the sodium salt of diethyldithiophosphoric acid were reacted with 16.4 parts of N-chlorethylallylcarbamate (B.P. 59 to 61° C. at 0.03 mm. of Hg) in a manner analogous to that described under 1. After distillation in a high vacuum (molecular distillation column), there were obtained 21.5 parts of a compound of the formula $$(C_2H_5O)_2P-SCH_2CH_2NHCOOCH_2CH=CH_2$$
$$\underset{\parallel}{S}$$

B.P. 175 °C. at 0.005 mm. of Hg; $n_D^{21}$: 1.5176.

Analysis.—Calculated: S 20.46%. Found: S 20.63%.

(11) 22 parts of a diethylthiophosphoric acid ester (Example 10) were dissolved in 50 parts by volume of carbontetrachloride. A solution of 11.25 parts of bromine in 25 parts by volume of carbon tetrachloride was then added dropwise at 0 to 5° C. The whole was stirred for ½ hour at room temperature and then the solvent was evaporated in vacuo. After the starting product had been distilled off, a viscous oil remained that corresponded to the formula $$(C_2H_5O)_2\overset{S}{\underset{\parallel}{P}}-SCH_2CH_2NHCOOCH_2CHBrCH_2Br$$

$n_D^{26}$: 1.5513

Analysis.—Calculated: S 13.55%. Found: S 13.36%.

(12) 22.9 parts of the sodium salt of diethyldithiophosphoric acid were reacted with 21.4 parts of N-chlorethylbenzylcarbamate ($n_D^{27}$: 1.5303) in a manner analogous to that described under 1. After distillation in a high vacuum (molecular distillation column), there were obtained 7.1 parts of a compound of the formula $$(C_2H_5O)_2P-SCH_2CH_2NHCOOCH_2-\!\!\left\langle\begin{array}{c}\phantom{X}\end{array}\right\rangle$$
$$\underset{\parallel}{S}$$

B.P. 175° C. at 0.01 mm. of Hg; $n_D^{24}$: 1.5460.

Analysis.—Calculated: S 17.65%. Found: S 17.5%.

(13) 20.8 parts of the sodium salt of diethyldithiophosphoric acid were reacted with 20 parts of N-chlorethyl-2-chlorophenyl-carbamate (M.P. 87 to 89° C.) in a manner analogous to that described under 1. After the starting product had been distilled off, 8.7 parts of a compound of the formula

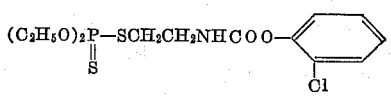

were obtained in the form of an oil. $n_D^{25}$:1.5560.

*Analysis.*—Calculated: S 16.71%. Found: S 16.8%.

(14) 22.9 parts of the sodium salt of diethyldithiophosphoric acid were reacted with 23.4 parts of N-chlorethyl-4-chlorophenyl-carbamate (M.P. 94 to 96° C.) in a manner analogous to that described under 1. After the starting products had been distilled off, 11.3 parts of a compound of the formula

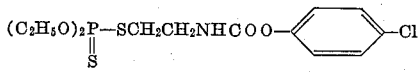

were obtained in the form of an oil. $n_D^{25}$:1.5572.

*Analysis.*—Calculated: S 16.7%. Found: S 17.1%.

(15) 30.4 parts of the sodium salt of diethyldithiophosphoric acid were reacted with 19.6 parts of N-chlorethyl-S-tertiary-butylthiocarbamate (M.P. 72 to 73° C.) in a manner analogous to that described under 1. After distillation in a high vacuum (molecular distillation column), there were obtained 17.9 parts of a compound of the formula

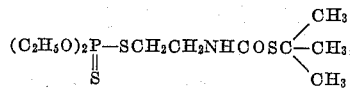

B.P. 165° C. at 0.01 mm. of Hg.

*Analysis.*—Calculated: S 27.84%. Found: S 28.2%.

(16) 22.9 parts of the sodium salt of diethyldithiophosphoric acid were reacted with 18 parts of N-chlorethylisobutylcarbamate (B.P. 119 to 122° C. at 12 mm. of Hg) in a manner analogous to that described under 1. After distillation in a high vacuum (molecular distillation column), there were obtained 18.9 parts of a compound of the formula

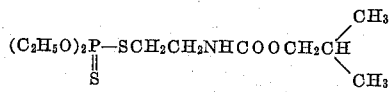

B.P. 175° C. at 0.04 mm. of Hg; $n_D^{22}$:1.4993.

(17) 22.9 parts of the sodium salt of diethyldithiophosphoric acid were reacted with 22.6 parts of the compound of the formula

in a manner analogous to that described under 1. After the starting product had been distilled off, 21.4 parts of a compound of the formula

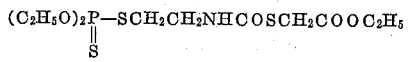

were obtained in the form of an oil. $n_D^{25}$:1.5328.

(18) 25 parts of the sodium salt of diethyldithiophosphoric acid were reacted with 17.8 parts of N-chlorethyl-2-butenylcarbamate (M.P. 102 to 103° C.) in a manner analogous to that described under 1. After the starting product had been distilled off, 17.1 parts of a compound of the formula

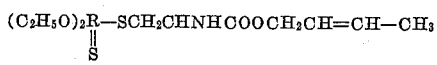

were obtained in the form of an oil.

*Analysis.*—Calculated: S 19.59%. Found: S 19.2%.

(19) 25 parts of the sodium salt of diethyldithiophosphoric acid were reacted with 21.4 parts of N-chlorethyl-2-methyl-phenylcarbamate (M.P. 51 to 52° C.) in a manner analogous to that described under 1. After distillation in a high vacuum (molecular distillation column), there were obtained 14.6 parts of a compound of the formula

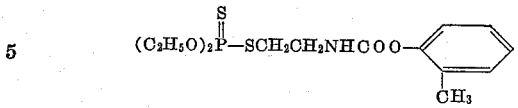

B.P. 165 to 170° C. at 0.04 mm. of Hg; $n_D^{20}$: 1.5480.

*Analysis.*—Calculated: S 17.65%. Found: S 16.9%.

(20) 23.4 parts of the sodium salt of dimethyldithiophosphoric acid were reacted with 21 parts of N-chlorethylisopropylcarbamate in a manner analogous to that described under 1. After distillation in a high vacuum, there were obtained 17.5 parts of a compound of the formula

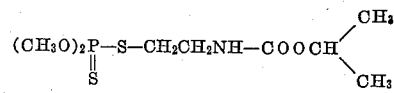

B.P. 144 to 147° C. at 0.09 mm. of Hg; $n_D^{24}$:1.5036.

(21) 23.4 parts of the sodium salt of dimethyldithiophosphoric acid were reacted with 18.2 parts of N-chlorethyl-S-isopropylthiocarbamate (B.P. 76° C. at 0.015 mm. of Hg) in a manner analogous to that described under 1. After distillation in a high vacuum (molecular distillation column) there were obtained 12.5 parts of a compound of the formula

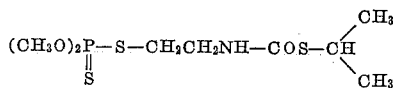

B.P. 175° C. at 0.005 mm. of Hg; $n_D^{25}$:1.5353.

The following compounds were also obtained in an analogous manner:

(22) 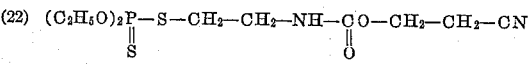

B.P. 175° C. at 0.01 mm. of Hg.

(23)

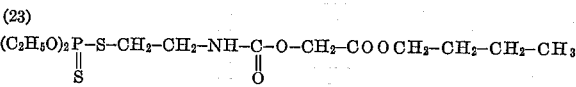

B.P. 175° C. at 0.01 mm. of Hg.

(24)

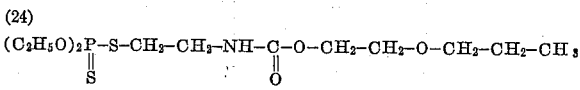

B.P. 175° C. at 0.01 mm. of Hg.

*Example 2*

7 solutions were prepared by mixing 1 part of a condensation product prepared from 1 mol of tertiary octylphenol, 8 mols of ethyleneoxide and 7 parts of isopropanol with 2 parts of a condensation product described in Example 1, Nos. 1, 2, 5, 8, 10, 18 and 22 respectively. The clear solutions thus prepared were employed as spray concentrates which could be emulsified by pouring into water.

The following experiment was carried out in order to determine the contact action on aphids, sprays having an active-principle content of 0.08%, 0.04%, 0.2% and 0.01% being used.

Broad bean plants heavily infested with aphids were sprayed on all sides, and the action was determined after 48 hours. The results obtained are listed in the following Table I.

The meanings of the signs are as follows: + indicates that no live aphids are present; — indicates inadequate action or no action; I indicates a good action, only a few live aphids are present. One sign has been assigned to each plant.

TABLE I

| Conc. of active principle in spray | Comp. Ex. 1 No. 1 | Comp. Ex. 1 No. 2 | Comp. Ex. 1 No. 5 | Comp. Ex. 1 No. 8 | Comp. Ex. 1 No. 10 | Comp. Ex. 1 No. 18 | Comp. Ex. 1 No. 22 |
|---|---|---|---|---|---|---|---|
| 0.08% | + + | + + | + + | + + | + + | + + | + + |
| 0.04% | + + | I I | + + | + + | + + | + + | + + |
| 0.04% | + + | I I | + + | + + | + + | + + | + + |
| 0.02% | + + | + + | + + | + + | + + | + + | + + |
| 0.01% | + + | + + | + + | I I | + + | I I | + + |

Example 3

(a) In order to determine the acaricidal action on the red spider mite (Tetranychus urticae), sprays of the composition given above in Example 2 were used. The 24 sprays used contained in each case 0.04% of the compounds listed in the following Table II, which compounds correspond to those enumerated in Example 1.

*Method of testing.*—Broad bean plants heavily infested with red spider mites were sprayed on all sides and the acaricidal or ovicidal action was determined after 7 days. The results are given in the following Table II; + indicates all mites killed, I indicates good acaricidal action, but still a few living mites present.

TABLE II

| Compound Example 1 | Action on red spider mite (Tetranychus urticae) |
|---|---|
| No. 1 | + |
| 2 | I |
| 3 | + |
| 4 | + |
| 5 | + |
| 6 | + |
| 7 | + |
| 8 | + |
| 9 | + |
| 10 | + |
| 11 | + |
| 12 | + |
| 13 | + |
| 14 | + |
| 15 | + |
| 16 | + |
| 17 | + |
| 18 | + |
| 19 | + |
| 20 | + |
| 21 | + |
| 22 | + |
| 23 | I |
| 24 | + |

(b) The compounds given in Example 1, especially those listed under the numbers 1, 3, 10, 13 to 19, 21 and 23, also showed a good action on *Gastroidea viridula* when used in a concentration of 0.04%. The killing effect was 80 to 100%.

What is claimed is:

1. A compound of the formula

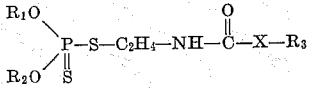

wherein $R_1$ and $R_2$ each represents an alkyl radical containing at most 4 carbon atoms, X represents a member selected from the group consisting of an oxygen atom and a sulfur atom and $R_3$ represents a member selected from the group consisting of (a) an alkyl radical containing at most 5 carbon atoms that is interrupted by a member selected from the group consisting of an oxygen atom, a sulfur atom and an $SO_2$ group, (b) an alkenyl radical containing at most 4 carbon atoms, (c) a cyanoethyl radical, (d) a benzyl radical, (e) a phenyl radical substituted by a member selected from the group consisting of a chlorine atom and an alkyl radical containing at most 4 carbon atoms, and (f) the radical of the formula —$CH_2$—$COOR_4$, in which $R_4$ represents an alkyl radical of at most 4 carbon atoms.

2. The compound of the formula

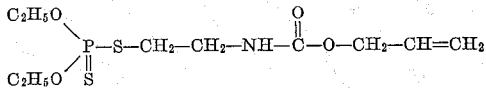

3. The compound of the formula

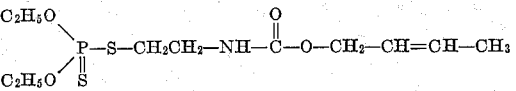

References Cited by the Examiner
UNITED STATES PATENTS

| | | | |
|---|---|---|---|
| 2,912,452 | 11/1959 | Schrader et al. | 260—461.112 |
| 3,020,305 | 2/1962 | Chupp | 260—461.112 |
| 3,093,536 | 6/1963 | Loeffler | 167—22 |
| 3,097,128 | 7/1963 | Sprinkle et al. | 167—22 |
| 3,242,498 | 3/1966 | Stoffey et al. | 260—938 |

CHARLES B. PARKER, *Primary Examiner.*

JULIAN S. LEVITT, *Examiner.*

RICHARD HUFF, DELBERT PHILLIPS,
*Assistant Examiners.*